(12) United States Patent
Yang

(10) Patent No.: US 11,709,803 B2
(45) Date of Patent: Jul. 25, 2023

(54) DATA TRANSACTION PROCESSING METHOD, APPARATUS, AND ELECTRONIC DEVICE

(71) Applicant: Alibaba Group Holding Limited, Grand Cayman (KY)

(72) Inventor: Lian Yang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 566 days.

(21) Appl. No.: 16/789,313

(22) Filed: Feb. 12, 2020

(65) Prior Publication Data

US 2020/0183892 A1 Jun. 11, 2020

Related U.S. Application Data

(63) Continuation of application No. PCT/CN2018/100419, filed on Aug. 14, 2018.

(30) Foreign Application Priority Data

Aug. 25, 2017 (CN) .......................... 201710738319.8

(51) Int. Cl.
*G06F 16/18* (2019.01)
*G06F 16/16* (2019.01)
(Continued)

(52) U.S. Cl.
CPC .......... *G06F 16/1865* (2019.01); *G06F 9/543* (2013.01); *G06F 16/162* (2019.01);
(Continued)

(58) Field of Classification Search
None
See application file for complete search history.

(56) References Cited

U.S. PATENT DOCUMENTS 6,816,873 B2 11/2004 Cotner et al.
7,904,434 B2 3/2011 Yalamanchi et al.
(Continued)

FOREIGN PATENT DOCUMENTS

CN 101089857 A 12/2007
CN 101639835 A 2/2010
(Continued)

OTHER PUBLICATIONS

Extended European Search Report dated Mar. 23, 2021 for European Patent Application No. 18347869.7, 12 pages.
(Continued)

*Primary Examiner* — Kim T Nguyen
(74) *Attorney, Agent, or Firm* — Lee & Hayes, P.C.

(57) ABSTRACT

A method, an apparatus, and an electronic device for processing a data transaction are disclosed. The method includes receiving an application request from a client to perform a data operation in a target data partition; creating a corresponding data transaction according to the application request, and assigning a transaction identifier to the data transaction; returning the transaction identifier that is assigned to the data transaction to the client; performing the data operation based on the target data partition according to the data operation carrying the transaction identifier and sent by the client; and processing the data transaction according to a transaction instruction sent by the client. The method enables a data operation to implement transactional attributes, and to satisfy a transactional nature of the data operation. Moreover, the service logic of data transactions implemented by the method is relatively simple, thus ensuring that data services have a good transactional nature.

20 Claims, 8 Drawing Sheets

(51) Int. Cl.
  *G06F 16/182* (2019.01)
  *G06F 16/17* (2019.01)
  *G06F 9/54* (2006.01)
  *G06F 21/62* (2013.01)
(52) U.S. Cl.
  CPC ........ *G06F 16/168* (2019.01); *G06F 16/1734* (2019.01); *G06F 16/182* (2019.01); *G06F 21/6218* (2013.01); *G06F 2221/0751* (2013.01)

(56) References Cited

U.S. PATENT DOCUMENTS

| | | | |
|---|---|---|---|
| 8,442,962 | B2 | 5/2013 | Lee et al. |
| 9,348,640 | B2 | 5/2016 | Horii |
| 9,613,122 | B2 | 4/2017 | Chao et al. |
| 10,339,127 | B2 | 7/2019 | Colrain et al. |
| 11,061,735 | B2* | 7/2021 | Li .................. G06F 9/5066 |
| 11,113,624 | B2* | 9/2021 | Liu .................. G06N 20/00 |
| 11,120,142 | B2* | 9/2021 | Chen ................ G06F 21/602 |
| 2008/0126346 | A1 | 5/2008 | Zheng |
| 2011/0041006 | A1 | 2/2011 | Fowler |
| 2011/0161281 | A1 | 6/2011 | Sayyaparaju et al. |
| 2019/0019104 | A1* | 1/2019 | Liu .................. G06N 20/00 |
| 2019/0213203 | A1 | 7/2019 | Lee et al. |
| 2020/0183892 | A1* | 6/2020 | Yang ................ G06F 16/168 |

FOREIGN PATENT DOCUMENTS

| | | |
|---|---|---|
| CN | 105723679 | 6/2016 |
| WO | WO2016078423 A1 | 5/2016 |
| WO | WO2018077073 A1 | 5/2018 |

OTHER PUBLICATIONS

Translation of International Search Report from corresponding PCT Application No. PCT/CN2018/100419, dated Nov. 8, 2018, 2 pages.
Translation of Written Opinion from corresponding PCT Application No. PCT/CN2018/100419, dated Nov. 8, 2018, 4 pages.
Translation of First Chinese Office Action from corresponding PCT U.S. Appl. No. 16/789,313, dated Sep. 27, 2022, 18 pages.
European Office Action dated Jun. 9, 2022 for European Patent Application No. 18847869.7, a foreign counterpart to U.S. Appl. No. 16/789,313, 7 pages.

* cited by examiner

DATA TRANSACTION PROCESSING METHOD, APPARATUS, AND ELECTRONIC DEVICE

CROSS REFERENCE TO RELATED PATENT APPLICATIONS

This application claims priority to and is a continuation of PCT Patent Application No. PCT/CN2018/100419 filed on 14 Aug. 2018, and is related to and claims priority to Chinese Application No. 201710738319.8, filed on 25 Aug. 2017 and entitled "Data Transaction Processing Method, Apparatus, and Electronic Device," which are hereby incorporated by reference in their entirety.

TECHNICAL FIELD

The present specification relates to the field of computer technologies, and particularly to data transaction processing methods, apparatuses, and electronic devices.

BACKGROUND

A database transaction is a basic work unit of a database, allowing the database to transition from one consistent state to another consistent state. A database transaction allows for simultaneously performing write operations on different data items in a database. These operations are either all executed successfully or all are not executed. Even if a failure occurs in a system, unfinished database transactions can still be correctly recovered. Database transactions can be isolated to different degrees to ensure the correctness of data.

Currently, in a distributed database, data is distributed on different machines. A database transaction often needs to access multiple machines. In order to ensure the atomicity of transactions, it is necessary to ensure that machines participating in a database transaction cooperate with each other. This process is very complicated and has a large impact on the performance of a system. Therefore, most distributed databases do not support transactions. A typical service scenario of a mailbox service is used as an example. Each email has the following attributes: a sender, a time, a status (read/unread), etc. When a new email is received by an email account, operations such as storing the content of the new email, modifying an inbox list and the number of unread messages, etc., need to be performed. In order to meet the requirements of different query and sorting conditions, the service also creates different indices for original data. Each time when a piece of original data and multiple pieces of index data are written, these write operations need to be completed in a transaction. However, in a scenario where a database does not support multi-row transactions, the service needs to implement various characteristics of the transaction. Referring to a schematic diagram of a write logic of a service layer shown in FIG. 1, original data is updated according to data that is read. After one piece of data is written successfully, another piece of data is written, until all pieces of data are successfully written. However, this type of method needs to consider rollback processing for each write failure, and an infinite retry is needed when data that has been written is rolled back and deleted, having a relatively complicated service logic. In addition, if a crash occurs in a program of the service, no rollback can be performed for data that has been written, and thus transactional requirements cannot be met.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides a data transaction processing method to solve the problems that exist in existing technologies.

The present disclosure also relates to a data transaction processing apparatus, other data transaction processing method and apparatus, and two electronic devices.

The present disclosure provides a data transaction processing method, which includes receiving an application request from a client to perform a data operation in a target data partition; creating a corresponding data transaction according to the application request, and assigning a transaction identifier to the data transaction; returning the transaction identifier that is assigned to the data transaction to the client; performing the data operation based on the target data partition according to the data operation that carries the transaction identifier and is sent by the client; and processing the data transaction according to a transaction instruction sent by the client.

In implementations, the target data partition includes a partition key in a data table included in a database, and correspondingly, the data transaction includes a database transaction.

In implementations, a primary key of the data table is composed of at least one primary key column in the data table.

The partition key includes a single partition key composed of a first primary key column of the data table.

In implementations, the transaction instruction includes a transaction commit instruction and a transaction cancel instruction.

In implementations, if the transaction instruction sent by the client is the transaction commit instruction, processing the data transaction according to the transaction instruction sent by the client is implemented by: sending the database transaction to a transaction queue; and reading the database transaction from the transaction queue, creating a transaction log corresponding to the database transaction, and recording a data operation of the database transaction in the transaction log.

In implementations, reading the database transaction from the transaction queue, creating the transaction log corresponding to the database transaction, and recording the data operation of the database transaction in the transaction log perform the following operation:

storing the transaction log in a preset data storage space.

In implementations, after storing the transaction log in the preset data storage space is performed, the following sub-operation is performed:

deleting the database transaction, and recovering the transaction identifier corresponding to the database transaction.

In implementations, if the transaction instruction sent by the client is the transaction cancel instruction, processing the data transaction according to the transaction instruction sent by the client is implemented by: deleting the database transaction, and recovering the transaction identifier of the database transaction.

In implementations, after performing the data operation based on the target data partition according to the data operation that carries the transaction identifier and is sent by the client, the following operation is performed:

receiving a transaction instruction sent by the client for processing the database transaction.

In implementations, after receiving the transaction instruction for processing the database transaction sent by the client is performed, the following operations are performed:

determining whether a database transaction corresponding to the transaction instruction exists, and returning a prompt message that the database transaction corresponding to the transaction instruction does not exist to the client if not.

In implementations, a state of the partition key includes at least one of the following: a locked state and an unlocked state.

If the received application request is an application request for performing a data operation under the partition key, a state of the partition key is updated to a locked state.

In implementations, after receiving the application request for performing the data operation on the target data partition sent by the client, and before creating the corresponding data transaction according to the application request, and assigning the transaction identifier to the data transaction, the following operations are performed:

determining whether a state of the partition key is an unlocked state; and if not, creating the corresponding data transaction according to the application request, and assigning the transaction identifier to the data transaction.

In implementations, the database includes a logically unified distributed database formed by connecting a plurality of physically dispersed data storage units through a network.

In implementations, the data transaction processing method is implemented based on a platform of a distributed database deployed in a cloud computing environment, the platform of the distributed database providing a data access interface for accessing the distributed database, and receiving the application request sent by the client for performing a data operation on a partition key of the distributed database through the data access interface, and/or receiving the transaction instruction sent by the client for processing the database transaction through the data access interface.

The present disclosure also provides a data transaction processing apparatus, which includes an application receiving unit configured to receive an application request sent by a client for performing a data operation on a target data partition; a data transaction creating unit configured to create a corresponding data transaction according to the application request, and allocate a transaction identifier to the data transaction; a transaction identifier returning unit configured to return the transaction identifier allocated to the data transaction to the client; a data operation submitting and executing unit configured to execute the data operation based on the target data partition according to a data operation sent by the client and carrying the transaction identifier; and a data transaction processing unit configured to process the data transaction according to a transaction instruction sent by the client.

The present disclosure further provides a data transaction processing method, which includes sending an application request for performing a data operation on a target data partition to a server; receiving a transaction identifier of a data transaction corresponding to the application request returned by the server; submitting a data operation carrying the transaction identifier to the server for performing the data operation on the target data partition; and sending a transaction instruction for processing the data transaction to the server based on the transaction identifier.

In implementations, the target data partition includes a partition key in a data table included in a database, and correspondingly, the data transaction includes a database transaction.

In implementations, a primary key of the data table is composed of at least one primary key column in the data table, and the partition key includes a single partition key composed of a first primary key column of the data table.

In implementations, the transaction instruction includes a transaction commit instruction or a transaction cancel instruction.

In implementations, the data transaction processing method includes:

receiving prompt information that no database transaction corresponding to the transaction instruction returned by the server exists.

The present disclosure further provides a data transaction processing apparatus, which includes an application sending unit configured to send an application request for performing a data operation on a target data partition to a server; a transaction identifier receiving unit configured to receive a transaction identifier of a data transaction corresponding to the application request returned by the server; a data operation submitting unit configured to submit a data operation carrying the transaction identifier to the server, for performing the data operation on the target data partition; and a transaction instruction sending unit configured to send a transaction instruction for processing the data transaction to the server based on the transaction identifier.

The present disclosure also provides an electronic device, which includes memory, and a processor, the memory being configured to store computer-executable instructions, and the processor being configured to execute the computer-executable instructions:

receiving an application request from a client to perform a data operation in a target data partition;

creating a corresponding data transaction according to the application request, and assigning a transaction identifier to the data transaction;

returning the transaction identifier that is assigned to the data transaction to the client; performing the data operation based on the target data partition according to the data operation that carries the transaction identifier and is sent by the client; and processing the data transaction according to a transaction instruction sent by the client.

The present disclosure also provides an electronic device, which includes memory, and a processor, the memory being configured to store computer-executable instructions, and the processor being configured to execute the computer-executable instructions:

sending an application request for performing a data operation on a target data partition to a server;

receiving a transaction identifier of a data transaction corresponding to the application request returned by the server;

submitting a data operation carrying the transaction identifier to the server for performing the data operation on the target data partition; and sending a transaction instruction for processing the data transaction to the server based on the transaction identifier.

The data transaction processing method provided in the present disclosure receives an application request for a data operation on a target data partition sent by a client, creates a corresponding data transaction according to the application request, assigns a transaction identifier to the data transaction, returns the transaction identifier of the data transaction to the client, performs the data operation based on the target data partition according to the data operation sent by the client and carrying the transaction identifier, and processes the data transaction according to the transaction instruction sent by the client.

In the data transaction processing method, when processing a data transaction for a data operation on a target data partition performed by the client, a transaction identifier is allocated to the data transaction that is created, and the transaction identifier is returned to the client. The client submits a data operation carrying the transaction identifier, and a data operation is performed on the target data partition. Finally, the data transaction according is processed according to a transaction instruction sent by the client. As such, the data operation implements attributes of a transaction, and the transactional nature of the data operation is satisfied. At the same time, the service logic of data transactions implemented by the data transaction processing method is relatively simple, thus ensuring that data services have a good transactional nature.

DETAILED DESCRIPTION

A number of specific details are set forth in the following description in order to enable a full understanding of the present disclosure. However, the present disclosure can be implemented in many other ways different from those described herein. One skilled in the art can make similar generalizations without violating the content of the present disclosure. Therefore, the present disclosure is not limited by specific implementations disclosed below.

The present disclosure provides a data transaction processing method. The present disclosure also provides a data transaction processing apparatus, other data transaction processing method and apparatus, and two electronic devices, which are sequentially described in detail with reference to the accompanying drawings of the embodiments provided in the present disclosure, and each operation of the methods is described.

An embodiment of a data transaction processing method provided in the present disclosure is given as follows.

Figure 1:
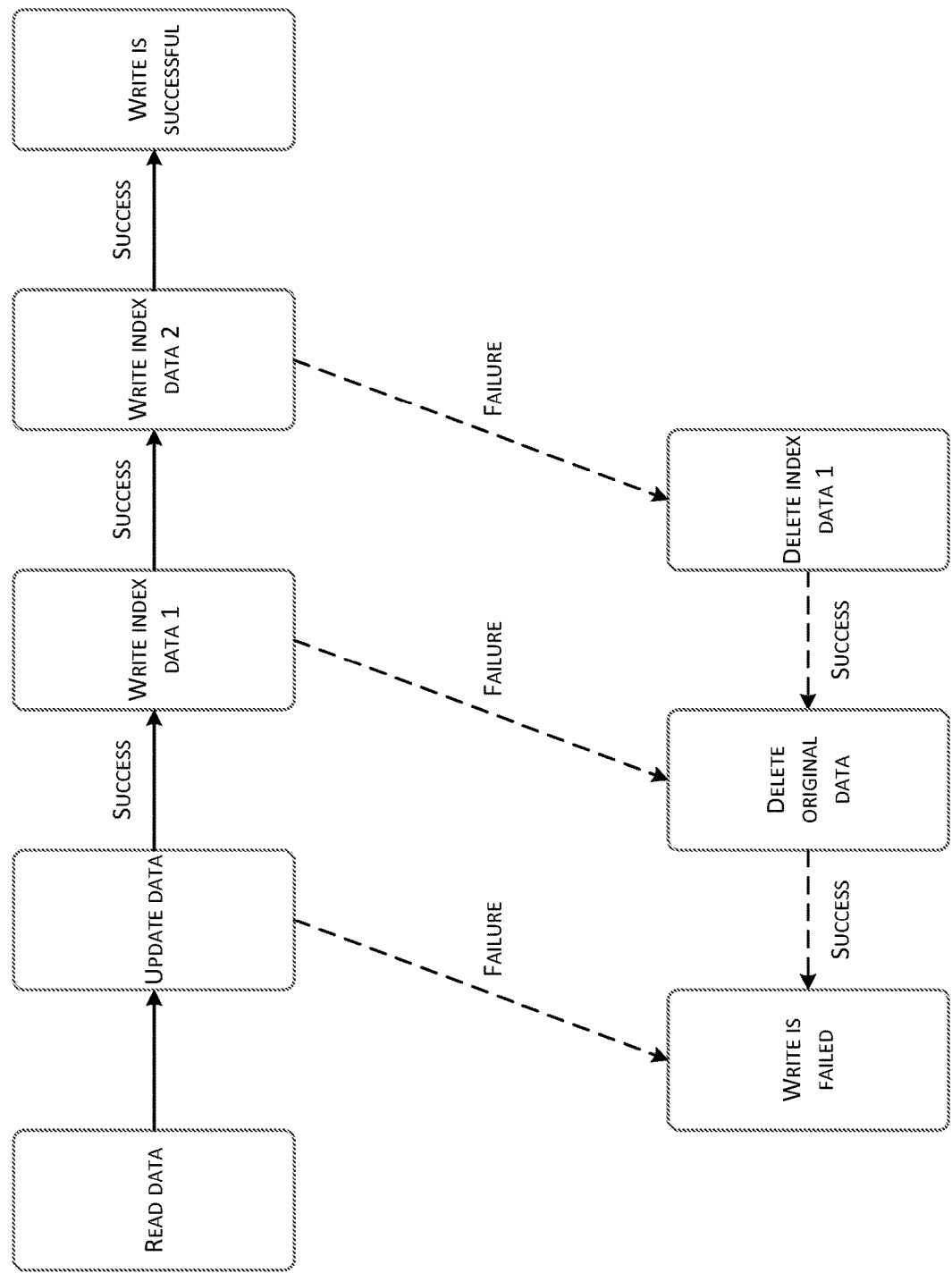
FIG. 1 is a schematic diagram of the write logic of a service layer provided by existing technologies.
Figure 2A:
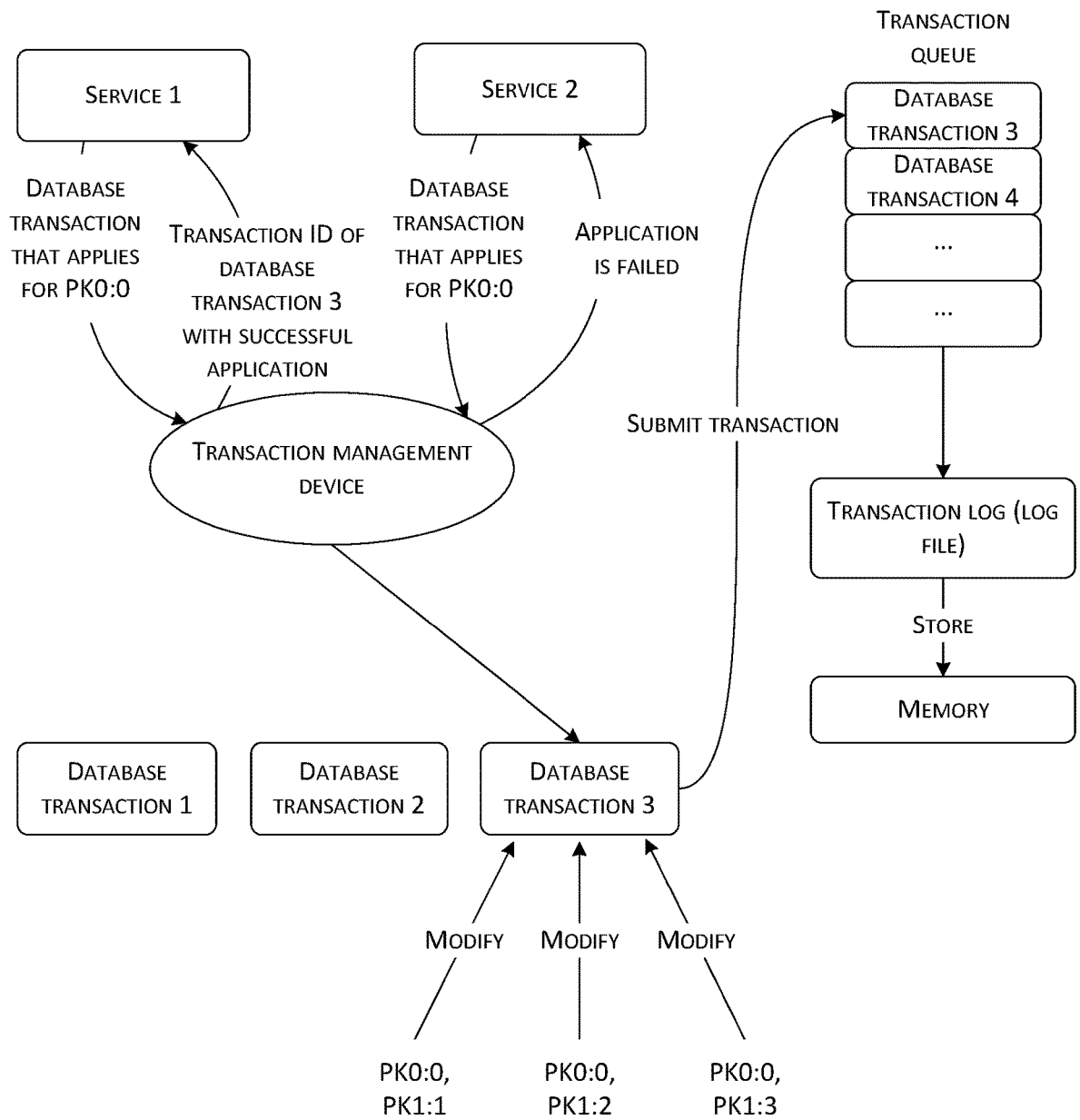
FIG. 2A is a schematic diagram of a database transaction processing scenario provided by the present disclosure.
Figure 2B:
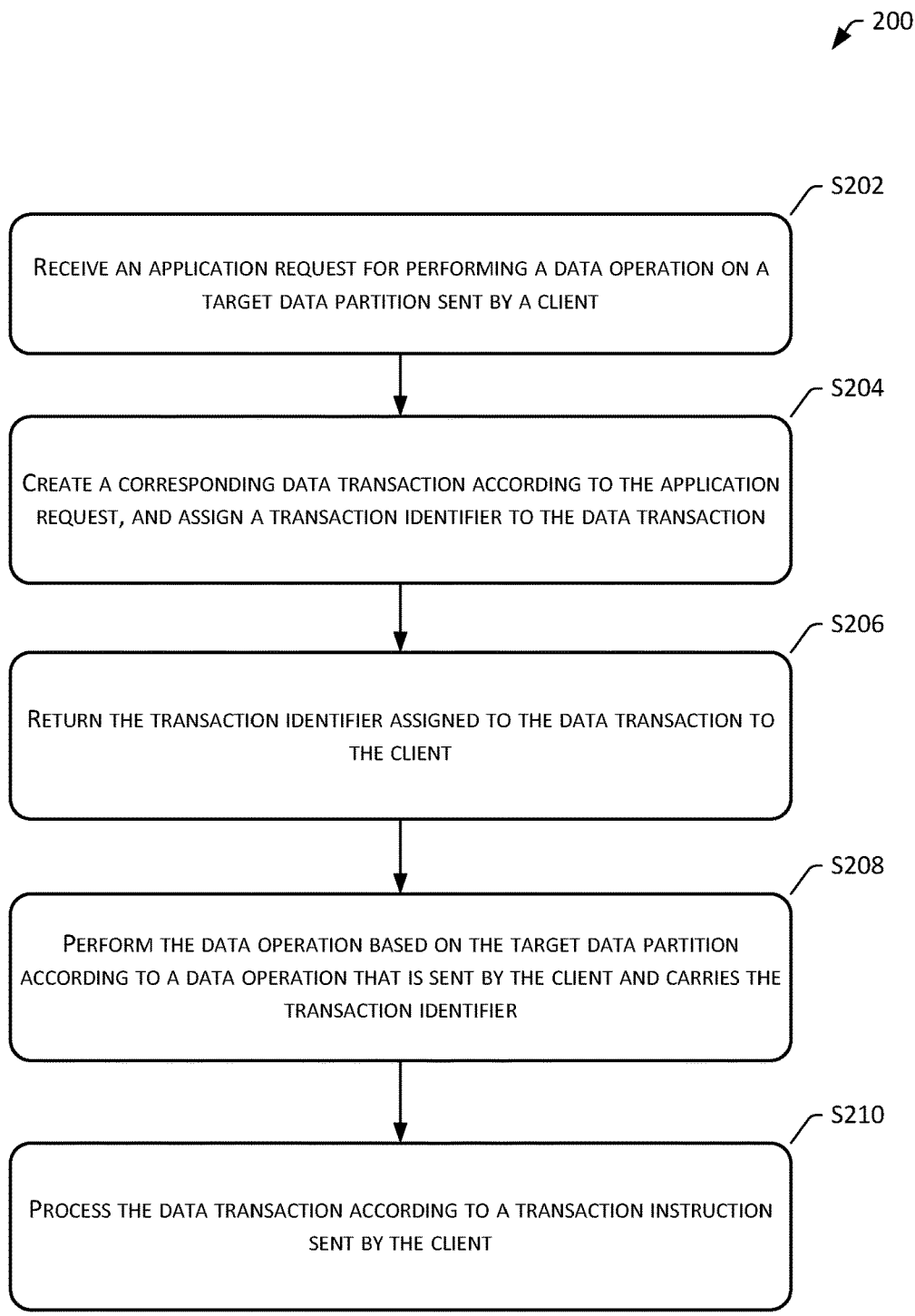
FIG. 2B is a flowchart of a database transaction processing method provided by the present disclosure.

Referring to FIG. 2A, a schematic diagram of a database transaction processing scenario provided by the present disclosure is shown. FIG. 2B illustrates a flowchart of a database transaction processing method 200 provided by the present disclosure. The method 200 may include the following operations.

S202: Receive an application request for performing a data operation on a target data partition sent by a client.

This operation is a basis for subsequent data operations on the target data partition. Only through the application request for performing the data operation on the target data partition sent by the client, it is possible to obtain the permission to perform the data operation on the target data partition. The embodiments of the present disclosure use a database transaction as an example for description, such as a database transaction of a distributed database (such as a NoSQL database) built on a distributed system. The distributed system refers to a logically unified database formed by connecting a plurality of physically dispersed data storage units through a network. Based on the distributed database, data fragmentation and load balancing can be used to achieve a seamless extension of the distributed database.

The target data partition refers to a data set that the client desires to operate. In implementations, the target data partition refers to a partition key among partitions, and the partitions refer to basic scheduling units for load balancing in data storage. By horizontal expansion of data storage through partitions, performance and availability are ensured. Specifically, a primary key of a data table included in the database is composed of at least one primary key column in the data table, and the partition key refers to a single partition key composed of a first primary key column of the data table. Multiple partition keys may be included in one partition, and no overlap exists between these partition keys. In addition, in a specific implementation, the target data partition may also be a primary key column or a collection of multiple primary key columns other than the partition key in the data table. For example, the target data partition may also be a single partition key composed of any primary key column other than the first primary key column of the data table. Alternatively, the target data partition may also be a joint partition key composed of multiple primary key columns of the data table. Alternatively, the target data partition may also be a joint partition key composed of multiple partition keys. The present embodiment does not have any limitations thereon. The client embeds the partition key of the target data partition in the application request. In response to receiving the application request from the client, the partition key in the application request is obtained, and thereby a data set that the client desires to operate is determined. The data operation refers to specific operation on data under the partition key, such as adding a row of data, deleting a row of data, modifying a certain row, one or more values in certain rows of data, reading one or more pieces of certain data, etc.

In this operation, the application request sent by the client for performing the data operation under the partition key, i.e., an application for a database transaction of the partition key, is received. For example, as shown in FIG. 2A, a database transaction for applying a partition key PK0 as 0 is received from a client corresponding to service 1.

S204: Create a corresponding data transaction according to the application request, and assign a transaction identifier to the data transaction.

The above S202 receives an application request for performing a data operation under a partition key from the client, i.e., a database transaction for applying the partition key. This operation creates a corresponding database transaction according to the application request, and allocates a transaction identifier for the database transaction.

The transaction identifier is an identification code allocated for a database transaction. A database transaction has one and only one transaction identifier, and transaction identifiers of each database transaction are different. More specifically, the transaction identifier may be in a form of a character string, or may be in a form of a number.

For example, as shown in FIG. 2A, after receiving a database transaction for applying a partition key PK0 as 0 from a client corresponding to service 1, a database transaction 3 is created, and a corresponding transaction ID is assigned to the newly created database transaction 3 (a transaction identifier).

In this operation, a transaction identifier is assigned to the database transaction, which provides a basis for the client to modify the database transaction. Since a server allocates different database transactions to clients corresponding to a plurality of services at the same time, it is necessary to determine a specific database transaction to be modified by the client according to the transaction identifier. At the same time, since the server allocates different database transactions to clients corresponding to a plurality of services at the same time, a partition key corresponding to the database transaction is locked, while assigning a transaction identifier to the database transaction, i.e., disallowing database transactions other than the database transaction to perform data operations on data under the partition key. For example, as shown in FIG. 2A, after a database transaction 3 sent by a client corresponding to service 1 locks a partition key PK0 of 0, when a database transaction sent by a client corresponding to service 2 applies for the partition key PK0 of 0, such application is failed.

In practical applications, a corresponding state can be set for the partition key, which includes a locked state or an unlocked state. Once the application request received is an application request for performing a data operation under the current partition key, a state of the current partition key is updated to a locked state. If no application request for performing a data operation under the current partition key has been received, the state of the current partition key remains as an unlocked state.

Based thereupon, in a specific implementation, before creating the corresponding database transaction according to the application request and assigning the transaction identifier to the database transaction at this operation, it is necessary to determine whether a partition key applied by the client is locked, i.e., determining whether the partition key is locked by determining whether a state of the partition key is an unlocked state. If the partition key is already locked, a response indicating an application failure is made for the application request for performing the data operation under the partition key sent by the client at S202 above, and no database transaction is created, and no transaction identifier is assigned. If the partition key is not locked, this operation is performed to create a corresponding database transaction according to the application request, and assign a transaction identifier to the database transaction.

S206: Return the transaction identifier assigned to the data transaction to the client.

The above S204 creates a corresponding database transaction according to the application request, and assigns a transaction identifier to the database transaction. At this operation, the transaction identifier assigned to the database transaction at S204 is returned to the client. For example, as shown in FIG. 2A, the transaction ID assigned to the database transaction 3 is returned to the client corresponding to the service 1. The client corresponding to the service 1 receives the transaction ID of the database transaction 3, indicating that the application is successful.

In addition, after returning the transaction identifier assigned to the database transaction to the client, a timeout detection mechanism may also be started. The timeout detection mechanism specifically determines whether an action instruction sent by the client is received within a certain time threshold range, i.e., whether an action instruction for processing the data transaction sent by the client described at S208 below is received within the time threshold range. If not, a timeout is triggered, the database transaction is destroyed, and the transaction identifier is recycled. In other words, the database transaction is invalid, and the corresponding transaction identifier is also invalid. In a specific implementation, the time threshold range may be flexibly set according to an actual application scenario.

S208: Perform the data operation based on the target data partition according to a data operation that is sent by the client and carries the transaction identifier.

This operation performs the data operation based on the target data partition according to the data operation that is sent by the client and carries the transaction identifier. Specifically, in implementations, multiple rows of data in the same target data partition can be modified at the same time. For example, as shown in FIG. 2A, the service 1 can carry the transaction ID corresponding to the newly created database transaction 3, and modify multiple rows of data under the partition key PK0 of 0. These modifications are placed in memory and are not taken into effect immediately, and are not visible to other database transactions. Moreover, if a machine where the server is located crashes down, these changes will be lost.

S210: Process the data transaction according to a transaction instruction sent by the client.

At this operation, prior to processing the data transaction according to the transaction instruction sent by the client, it is necessary to perform a operation of receiving the transaction instruction for processing the database transaction sent by the client. Based on this, it is also possible to determine whether a database transaction corresponding to the transaction instruction exists after receiving the transaction instruction for processing the database transaction. If the database transaction exists, this operation is performed, and the data transaction is processed according to the transaction instruction sent by the client. If the database transaction does not exist, prompt information is returned to the client indicating that no database transaction corresponding to the transaction instruction exists.

The transaction instruction described in the embodiments of the present disclosure includes a transaction commit instruction or a transaction cancel instruction. These two transaction instructions are described separately below:

1) The transaction instruction sent by the client is a transaction commit instruction:

This operation processes the data transaction according to the transaction instruction sent by the client, and is specifically implemented in the following manner:

sending the database transaction to a transaction queue;

reading the database transaction from the transaction queue, creating a transaction log corresponding to the database transaction, and recording a data operation of the database transaction in the transaction log; and storing the transaction log in a preset data storage space.

In an actual application scenario, the server may interact with several clients at the same time, and different clients may submit different database transactions in a short period of time. These database transactions cannot be executed simultaneously. Therefore, a transaction queue is set, and the database transactions are submitted to the transaction queue. The database transactions are executed in order. Specifically, the transaction queue may be a linear table composed of database transactions. The transaction queue arranges the database transactions according to an order in which the database transactions are submitted, and sequentially reads the database transactions according to an order of arrangement.

For example, as shown in FIG. 2A, after receiving the transaction commit instruction sent by the client corresponding to the service 1 for the database transaction 3, the database transaction 3 is submitted to the transaction queue. Thereafter, database transactions in the transaction queue are processed, and the database transaction 3 is read from the transaction queue. The data operation of the database transaction 3 is recorded in a corresponding transaction log, and the transaction log is finally stored in the memory.

In addition, after the aforementioned commit operation for the database transaction is completed, the database transaction is destroyed, and the transaction identifier corresponding to the database transaction is recovered. At the same time, the partition key corresponding to the database transaction is unlocked, i.e., allowing other database transactions to perform data operations on the data under the partition key, to ensure an isolation of the database transactions. Isolation is a security guarantee provided by database transactions for conflicts between concurrent transactions. Database transactions can provide different levels of separation between concurrently executed transactions through locking, to avoid executions of multiple concurrent transactions that manipulate the same shared object, which may cause an abnormal situation.

2) The transaction instruction sent by the client is a transaction cancel instruction:

This operation processes the data transaction according to the transaction instruction sent by the client, and is specifically implemented in the following manner:

deleting the database transaction, and recovering the transaction identifier corresponding to the database transaction. Since the database transaction is not actually executed, the database transaction is invalidated, thus ensuring the atomicity of the database transaction.

In addition, in a specific implementation, the transaction instruction sent by the client for processing the database transaction further includes a transaction rollback instruction. The database transaction is rolled back before the database transaction is committed, the modification of the database transaction that was previously performed is discarded, and the processing of the database transaction is terminated.

In a specific implementation, the data transaction processing method provided in the present disclosure may also be implemented based on a platform of a distributed database deployed in a cloud computing environment. The platform of the distributed database is configured with a data access interface used for accessing the distributed database (such as a NoSQL database). When a client corresponding to a service wants to use the NoSQL database for service data processing, the client submits a database transaction that is based on a NoSQL database partition key application to the server by calling the data access interface. The server obtains the database transaction that is based on the NoSQL database-based partition key application submitted by the client corresponding to the service through the data access interface, and performs corresponding processing. At the same time, the client corresponding to the service also submits a transaction instruction for processing the database transaction to the server through the data access interface. The server obtains the transaction instruction through the data access interface, and processes the database transaction according to the transaction instruction.

In summary, in the data transaction processing method provided in the present disclosure, when processing a database transaction on which the client performs a data operation under the partition key, a transaction identifier is allocated to the created database transaction, and the transaction identifier is returned to the client. The client performs the data operation under the partition key by submitting the data operation carrying the transaction identifier, and processing on the database transaction is finally performed according to a transaction instruction sent by the client. This therefore enables the data operation to implement transactional attributes, and satisfy the transactional nature of the data operation. At the same time, the service logic of the data transaction processing method for implementing data transactions is relatively simple, ensuring data services to have a good transactional nature.

An embodiment of a data transaction processing apparatus provided in the present disclosure is given as follows.

In the foregoing embodiments, a data transaction processing method is provided. Correspondingly, the present disclosure also provides a data transaction processing apparatus, which will be described below with reference to the accompanying drawings.

Figure 3:
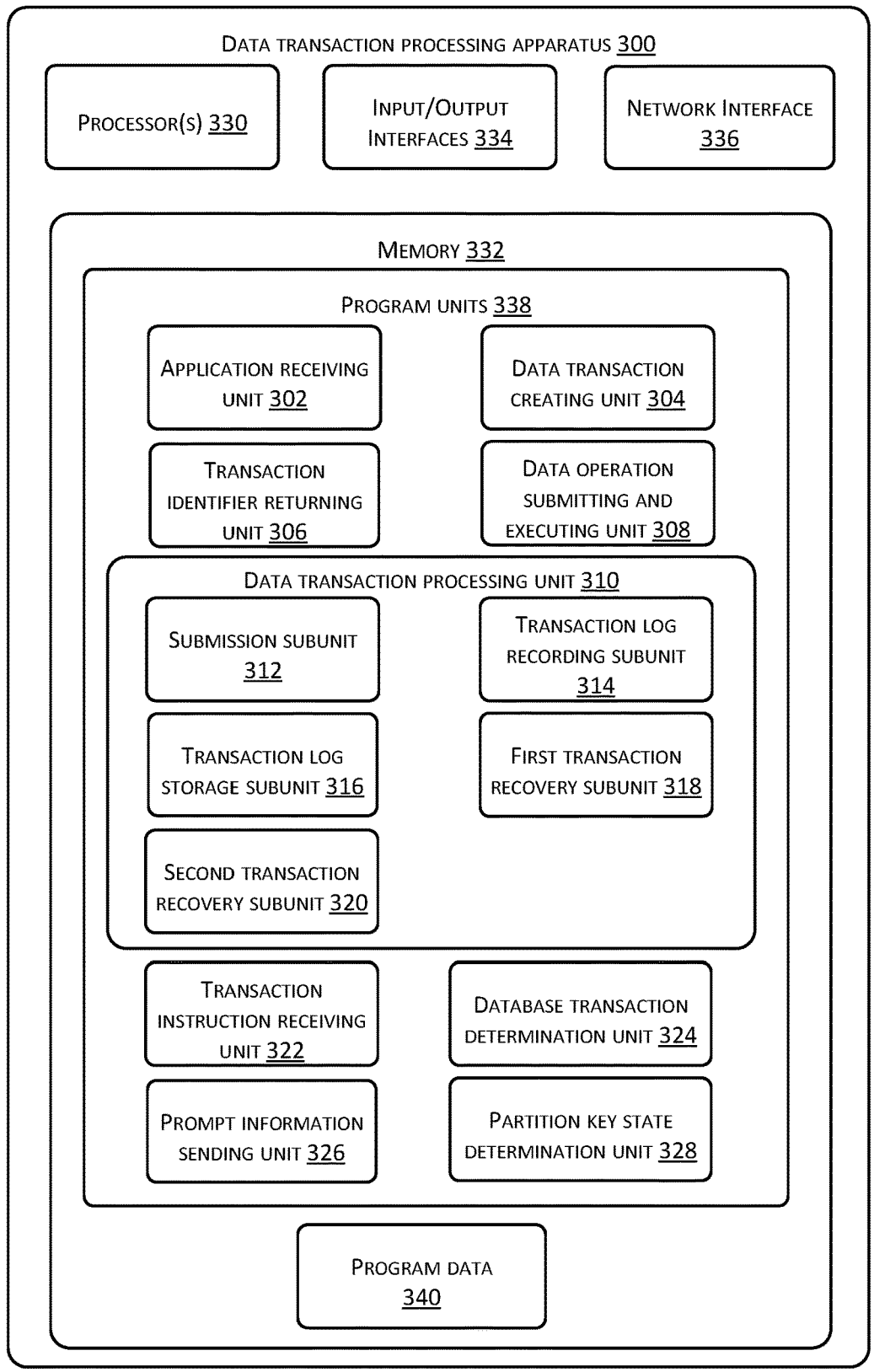
FIG. 3 is a schematic diagram of an embodiment of a data transaction processing apparatus provided by the present disclosure.

Referring to FIG. 3, a schematic diagram of an embodiment of a data transaction processing apparatus provided by the present disclosure is shown.

Since the apparatus embodiment is basically similar to the method embodiment, a description thereof is relatively simple. Related parts can be referenced to a corresponding description of the method embodiment provided above. The apparatus embodiment described below is only schematic.

The present disclosure provides a data transaction processing apparatus 300, which includes an application receiving unit 302 configured to receive an application request sent by a client for performing a data operation on a target data partition; a data transaction creating unit 304 configured to create a corresponding data transaction according to the application request, and assign a transaction identifier to the data transaction; a transaction identifier returning unit 306 configured to return the transaction identifier assigned to the data transaction to the client; a data operation submitting and executing unit 308 configured to execute the data operation based on the target data partition according to the data operation submitted by the client and carrying the transaction identifier; a data transaction processing unit 310 configured to process the data transaction according to a transaction instruction sent by the client.

In implementations, the target data partition includes a partition key in a data table included in a database.

Correspondingly, the data transaction includes a database transaction.

In implementations, a primary key of the data table is composed of at least one primary key column in the data table.

The partition key includes a single partition key composed of a first primary key column of the data table.

In implementations, the transaction instruction includes a transaction commit instruction or a transaction cancel instruction.

In implementations, if the transaction instruction sent by the client is the transaction commit instruction, the data transaction processing unit 310 includes a submission subunit 312 configured to submit the database transaction to a transaction queue; and a transaction log recording subunit 314 configured to read the database transaction from the transaction queue, create a transaction log corresponding to the database transaction, and record a data operation of the database transaction in the transaction log.

In implementations, the data transaction processing unit 310 includes a transaction log storage subunit 316 configured to store the transaction log in a preset data storage space.

In implementations, the data transaction processing unit 310 includes a first transaction recovery subunit 318 configured to delete the database transaction and recover the transaction identifier corresponding to the database transaction.

In implementations, if the transaction instruction sent by the client is the transaction cancel instruction, the data transaction processing unit 310 includes a second transaction recovery subunit 320 configured to delete the database transaction and recover the transaction identifier of the database transaction.

In implementations, the data transaction processing apparatus 300 includes a transaction instruction receiving unit 322 configured to receive the transaction instruction sent by the client for processing the database transaction.

In implementations, the data transaction processing apparatus 300 includes a database transaction determination unit 324 configured to determine whether a database transaction corresponding to the transaction instruction exists, and run a prompt information sending unit 326 if not; and the prompt information sending unit 326 configured to return prompt information indicating that no database transaction corresponding to the transaction instruction exists to the client.

In implementations, a state of the partition key includes at least one of the following: a locked state and an unlocked state.

If the received application request is an application request for performing a data operation under the partition key, a state of the partition key is updated to a locked state.

In implementations, the data transaction processing apparatus 300 includes a partition key state determination unit 328 configured to determine whether a state of the partition key is an unlocked state, and run the data transaction creation unit 304 if not.

In implementations, the database includes a logically unified distributed database formed by connecting a plurality of physically dispersed data storage units through a network.

In implementations, the data transaction processing apparatus operates based on a platform of a distributed database deployed in a cloud computing environment, and the platform of the distributed database provides a data access interface for accessing the distributed database, and receives the application request sent by the client for performing a data operation under a partition key of the distributed database through the data access interface, and/or receives the transaction instruction sent by the client for processing the database transaction through the data access interface.

In implementations, the apparatus 300 may further include one or more processors 330, memory 332, an input/output (I/O) interface 334, and a network interface 336.

The memory 332 may include a form of computer readable media such as a volatile memory, a random access memory (RAM) and/or a non-volatile memory, for example, a read-only memory (ROM) or a flash RAM. The memory 332 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 332 may include program units 338 and program data 340. The program units 338 may include one or more units and/or subunits as described in the foregoing description and shown in FIG. 3.

An embodiment of another data transaction processing method provided in the present disclosure is given as follows.

In the foregoing embodiments, a data transaction processing method is provided. In addition, the present disclosure provides another data transaction processing method that cooperates with the above data transaction processing method, which is described below with reference to the accompanying drawings.

Figure 4:
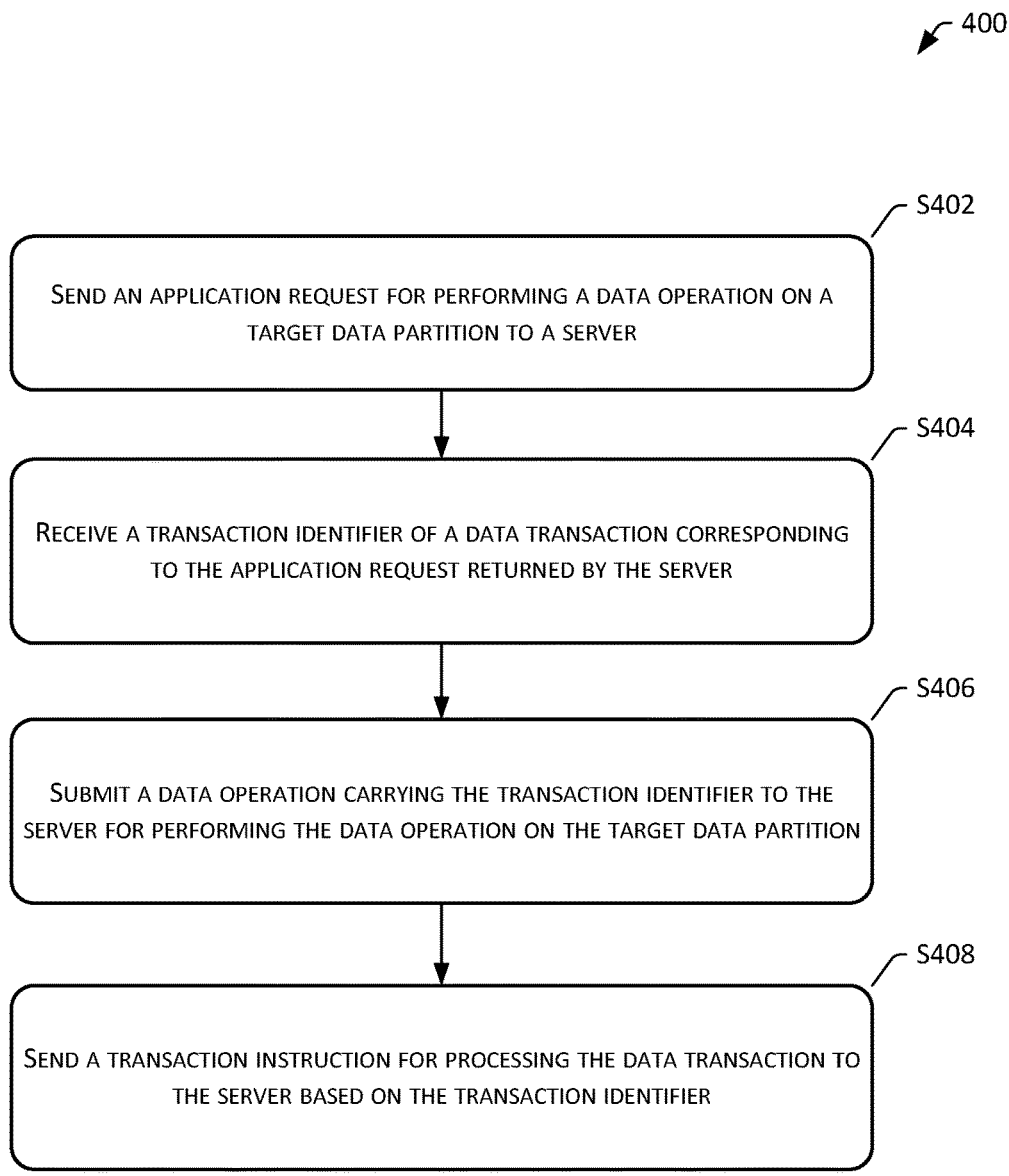
FIG. 4 is a flowchart of an embodiment of another data transaction processing method provided by the present disclosure.

Referring to FIG. 4, a processing flowchart of an embodiment of another data transaction processing method 400 provided in the present disclosure is shown. Referring to FIG. 2A, a schematic diagram of a database transaction processing scenario provided in the present disclosure is shown.

Since another data transaction processing method provided in the present disclosure cooperates with the above-mentioned data transaction processing method embodiment, a description thereof is relatively simple. For reading this embodiment, references are made to the corresponding description of the above data transaction processing method embodiment.

The present disclosure provides the other data transaction processing method 400, which includes the following operations.

S402: Send an application request for performing a data operation on a target data partition to a server.

A C/S structure is taken as an example. The above-mentioned data transaction processing method provided in the present disclosure is implemented based on the server, and the other data transaction processing method provided in the present disclosure is implemented based on a client. Similar to the C/S structure, the above-mentioned data transaction processing method provided in the present disclosure can also be implemented based on a data sender or data producer. Correspondingly, the other data transaction processing method provided in the present disclosure can also be based on a data processing party or a data consumer.

The target data partition refers to a data set that the client desires to operate. In implementations, the target data partition refers to a partition key among partitions, and the partitions refer to basic scheduling units for load balancing in data storage. By horizontal expansion of data storage through partitions, performance and availability are ensured. Specifically, a primary key of a data table included in the database is composed of at least one primary key column in the data table, and the partition key refers to a single partition key composed of a first primary key column of the data table. Multiple partition keys may be included in one partition, and no overlap exists between these partition keys. In addition, in a specific implementation, the target data partition may also be a primary key column or a collection of multiple primary key columns other than the partition key in the data table. For example, the target data partition may also be a single partition key composed of any primary key column other than the first primary key column of the data table. Alternatively, the target data partition may also be a joint partition key composed of multiple primary key columns of the data table. Alternatively, the target data partition may also be a joint partition key composed of multiple partition keys. The present embodiment does not have any limitations thereon. The data operation refers to specific operation on data under the partition key, such as adding a row of data, deleting a row of data, modifying a certain row, one or more values in certain rows of data, reading one or more pieces of certain data, etc.

In this operation, the client sends to the server an application request for performing a data operation under the partition key, i.e., applying for a database transaction to perform a data operation under the partition key.

S404: Receive a transaction identifier of a data transaction corresponding to the application request returned by the server.

The above operation S402 sends an application request for performing a data operation under the partition key to the server, i.e., applying for a database transaction to perform a data operation under the partition key. In response to receiving the application request, the server creates a corresponding database transaction according to the application request, assign a transaction identifier to the database transaction, and return the transaction identifier to the client. Based thereon, this operation receives the transaction identifier the database transaction corresponding to the application request from the server.

S406: Submit a data operation carrying the transaction identifier to the server for performing the data operation on the target data partition.

At S404, the transaction identifier of the database transaction corresponding to the application request returned by the server is received. After the client receives the transaction identifier, this indicates that the application for the database transaction is successful. Based thereon, at this operation, a data operation carrying the transaction identifier is submitted to the server for performing the data operation under the partition key.

S408: Send a transaction instruction for processing the data transaction to the server based on the transaction identifier.

In a specific implementation, after submitting the data operation carrying the transaction identifier to the server for performing the data operation under the partition key is performed at S406, a transaction instruction for processing the database transaction is sent to the server based on the transaction identifier at this operation. The transaction instruction includes a transaction commit instruction or a transaction cancel instruction. As described above, after receiving the transaction instruction for processing the database transaction, the server determines whether a database transaction corresponding to the transaction instruction exists, and if no database transaction exists, prompt information indicating that no database transaction corresponding to the transaction instruction exists is returned to the client. Therefore, after sending the transaction instruction for processing the database transaction to the server, the method further includes receiving prompt information indicating that no database transaction corresponding to the transaction instruction exists from the server.

In a specific implementation, the other data transaction processing method provided in the present disclosure may also be implemented based on a platform of a distributed database deployed in a cloud computing environment. The platform of the distributed database is configured with a data access interface used for accessing the distributed database (such as a NoSQL database). When a client corresponding to a service wants to use the NoSQL database for service data processing, the client submits a database transaction that is based on a NoSQL database partition key application to the server by calling the data access interface. The server obtains the database transaction that is based on the NoSQL database-based partition key application submitted by the client corresponding to the service through the data access interface, and performs corresponding processing. At the same time, the client corresponding to the service also submits a transaction instruction for processing the database transaction to the server through the data access interface. The server obtains the transaction instruction through the data access interface, and processes the database transaction according to the transaction instruction.

An embodiment of another data transaction processing apparatus provided in the present disclosure is given as follows.

In the foregoing embodiment, another data transaction processing method is provided. Correspondingly, the present disclosure also provides another data transaction processing apparatus, which is described below with reference to the accompanying drawings.

Figure 5:
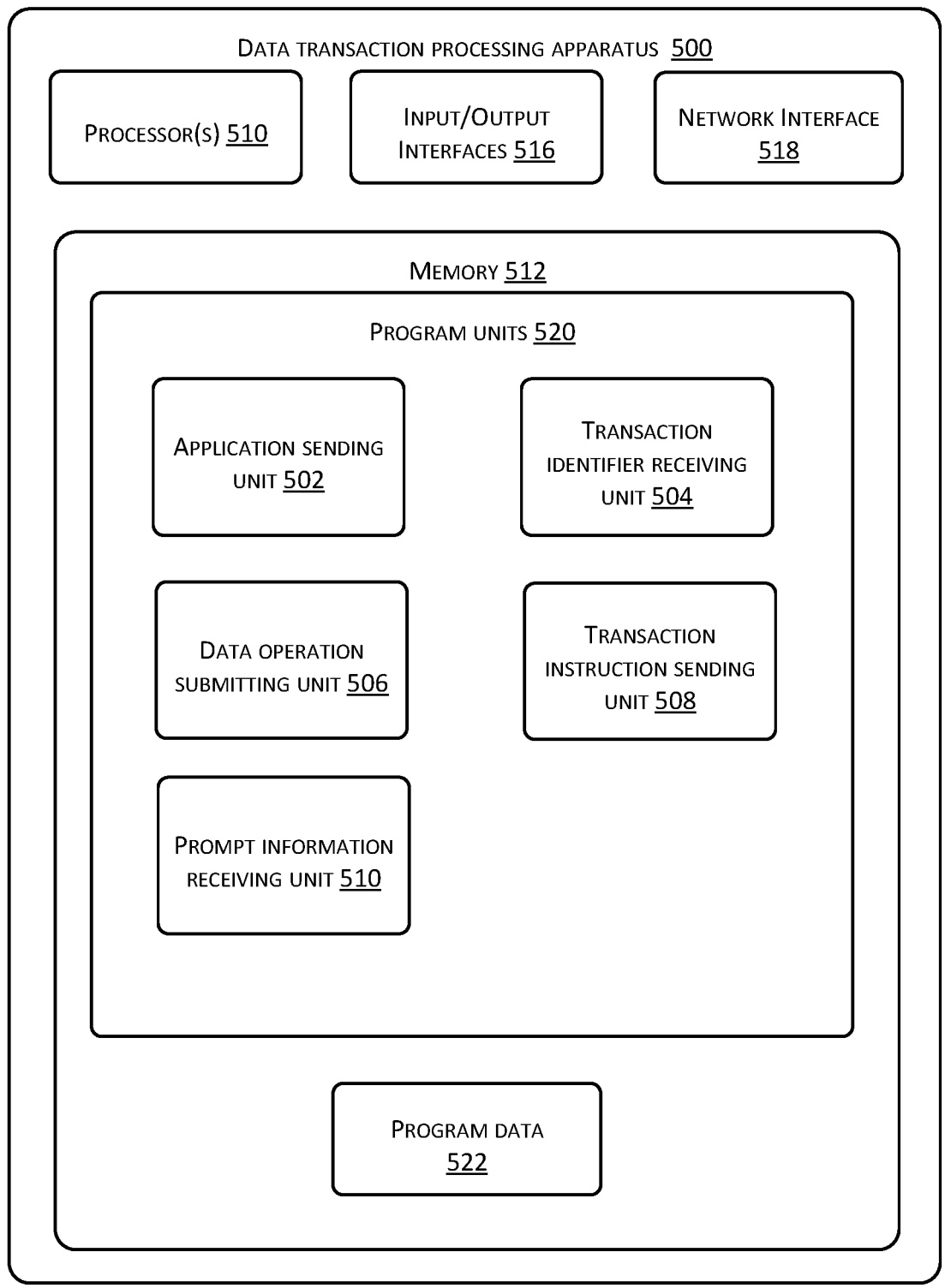
FIG. 5 is a schematic diagram of an embodiment of another data transaction processing apparatus provided by the present disclosure.

Referring to FIG. 5, a schematic diagram of an embodiment of another data transaction processing apparatus 500 provided by the present disclosure is shown.

Since the apparatus embodiment is basically similar to the method embodiment, a description thereof is relatively simple. Related parts can be referenced to a corresponding description of the method embodiment provided above. The apparatus embodiment described below is only schematic.

The present disclosure provides the other data transaction processing apparatus 500, which includes an application sending unit 502 configured to send an application request for performing a data operation on a target data partition to a server; a transaction identifier receiving unit 504 configured to receive a transaction identifier of a data transaction corresponding to the application request returned by the server; a data operation submitting unit 506 configured to submit a data operation carrying the transaction identifier to the server, for performing the data operation on the target data partition; and a transaction instruction sending unit 508 configured to send a transaction instruction for processing the data transaction to the server based on the transaction identifier.

In implementations, the target data partition includes a partition key in a data table included in a database.

Correspondingly, the data transaction includes a database transaction.

In implementations, a primary key of the data table is composed of at least one primary key column in the data table.

The partition key includes a single partition key composed of a first primary key column of the data table.

In implementations, the transaction instruction includes a transaction commit instruction or a transaction cancel instruction.

In implementations, the data transaction processing apparatus 500 includes a prompt information receiving unit 510 configured to receive prompt information indicating that no database transaction corresponding to the transaction instruction exists from the server.

In implementations, the apparatus 500 may further include one or more processors 512, memory 514, an input/output (I/O) interface 516, and a network interface 518. The memory 514 may include a form of computer readable media as described in the foregoing description.

In implementations, the memory 514 may include program units 520 and program data 522. The program units 520 may include one or more units as described in the foregoing description and shown in FIG. 5.

An example of an electronic device provided in the present disclosure is given as follows.

In the above embodiments, a data transaction processing method is provided. In addition, the present disclosure also provides an electronic device for implementing the data transaction processing method, which is described below with reference to the accompanying drawings.

Figure 6:
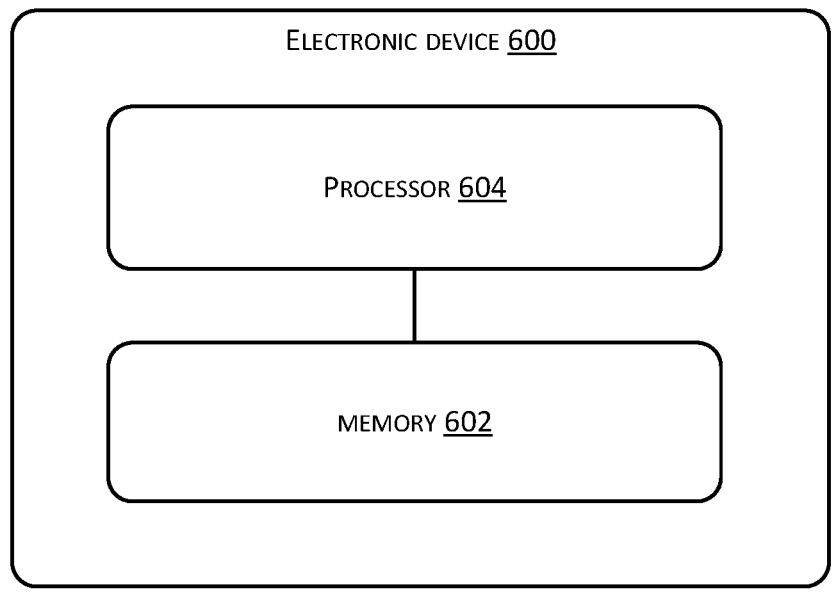
FIG. 6 is a schematic diagram of an embodiment of an electronic device provided by the present disclosure.

Referring to FIG. 6, a schematic diagram of an electronic device according to the embodiments of the present disclosure is shown.

A description of the embodiment of the electronic device provided in the present disclosure is relatively simple. Related parts can be referenced to a corresponding description of the embodiment of the data transaction processing method provided above. The embodiment described below is merely schematic.

The present disclosure provides an electronic device 600, which includes memory 602, and a processor 604, the memory 602 being configured to store computer-executable instructions, and the processor 604 being configured to execute the computer-executable instructions:

receiving an application request from a client to perform a data operation in a target data partition;

creating a corresponding data transaction according to the application request, and assigning a transaction identifier to the data transaction;

returning the transaction identifier that is assigned to the data transaction to the client; performing the data operation based on the target data partition according to the data operation that carries the transaction identifier and is sent by the client; and processing the data transaction according to a transaction instruction sent by the client.

In implementations, the target data partition includes a partition key in a data table included in a database.

Correspondingly, the data transaction includes a database transaction.

In implementations, a primary key of the data table is composed of at least one primary key column in the data table.

The partition key includes a single partition key composed of a first primary key column of the data table.

In implementations, the transaction instruction includes a transaction commit instruction or a transaction cancel instruction.

In implementations, if the transaction instruction sent by the client is the transaction commit instruction, processing the data transaction according to the transaction instruction sent by the client is implemented in the following manner:

sending the database transaction to a transaction queue; and reading the database transaction from the transaction queue, creating a transaction log corresponding to the database transaction, and recording a data operation of the database transaction in the transaction log.

In implementations, after reading the database transaction from the transaction queue, creating the transaction log corresponding to the database transaction, and recording the data operation of the database transaction in the transaction logic, the processor 602 is further configured to execute the following computer executable instructions:

storing the transaction log in a preset data storage space.

In implementations, after storing the transaction log in the preset data storage space, the processor 602 is further configured to execute the following computer-executable instructions:

deleting the database transaction, and recovering the transaction identifier corresponding to the database transaction.

In implementations, if the transaction instruction sent by the client is the transaction cancel instruction, processing the data transaction according to the transaction instruction sent by the client is implemented in the following manner:

deleting the database transaction, and recovering the transaction identifier of the database transaction.

In implementations, after executing the instructions of performing the data operation based on the target data partition according to the data operation that is submitted by the client and carries the transaction identifier, and before executing the instructions of processing the data transaction according to the transaction instruction sent by the client, the processor 602 is further configured to execute the following computer-executable instructions:

receiving a transaction instruction for processing the database transaction sent by the client.

In implementations, after executing the computer-executable instructions of receiving the transaction instruction for processing the database transaction sent by the client, the processor 604 is further configured to execute the following computer-executable instructions:

determining whether a database transaction corresponding to the transaction instruction exists, and if not, returning prompt information indicating that no database transaction corresponding to the transaction instruction exists to the client.

In implementations, a state of the partition key includes at least one of the following: a locked state and an unlocked state.

If the received application request is an application request for performing a data operation under the partition key, a state of the partition key is updated to a locked state.

In implementations, after executing the instructions of receiving the application request for performing the data operation on the target data partition sent by the client, and before executing the instructions of creating the corresponding data transaction according to the application request, and assigning the transaction identifier to the data transaction, the processor 604 is further configured to execute the following computer-executable instructions:

determining whether a state of the partition key is an unlocked state, and if not, executing the instructions of creating the corresponding data transaction according to the application request, and assigning the transaction identifier to the data transaction.

In implementations, the database includes a logically unified distributed database formed by connecting a plurality of physically dispersed data storage units through a network.

In implementations, the processor 604 executes the computer-executable instructions based on a platform of a distributed database deployed in a cloud computing environment, the platform of the distributed database providing a data access interface for accessing the distributed database, receiving the application request for performing the data operation for the partition key of the distributed database from the client through the data access interface, and/or receiving the transaction instruction for processing the database transaction from the client through the data access interface.

An embodiment of another electronic device provided in the present disclosure is given as follows.

In the above embodiments, another data transaction processing method is provided. In addition, the present disclosure also provides an electronic device for implementing the other data transaction processing method provided by the present disclosure, which is described below with reference to the accompanying drawings.

Figure 7:
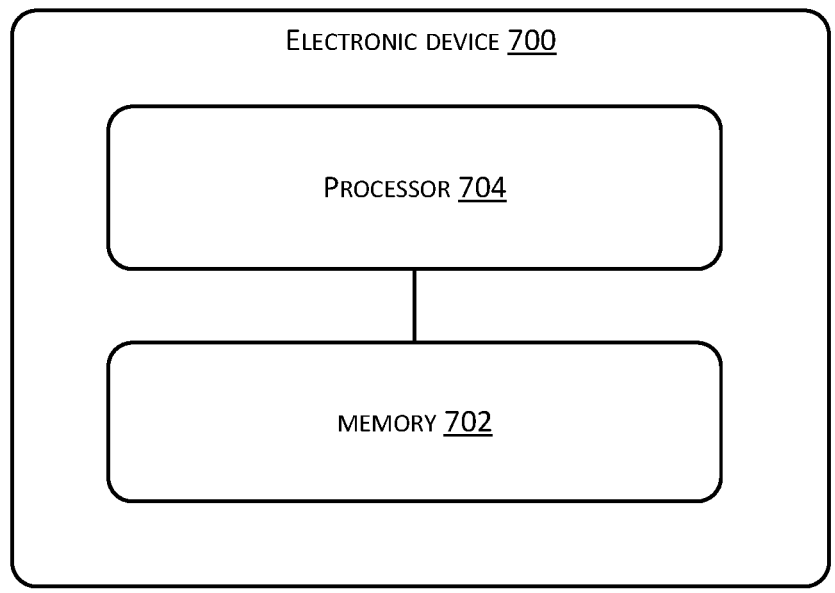
FIG. 7 is a schematic diagram of an embodiment of another electronic device provided by the present disclosure.

Referring to FIG. 7, a schematic diagram of another electronic device according to the embodiments of the present disclosure is shown.

A description of the embodiment of the electronic device provided in the present disclosure is relatively simple. Related parts can be referenced to a corresponding description of the embodiment of the other data transaction processing method provided above. The embodiment described below is merely schematic.

The present disclosure provides another electronic device 700, which includes memory 702, and a processor 704, the memory 704 being configured to store computer-executable instructions, and the processor 704 being configured to execute the computer-executable instructions:

sending an application request for performing a data operation on a target data partition to a server;

receiving a transaction identifier of a data transaction corresponding to the application request returned by the server; submitting a data operation carrying the transaction identifier to the server for performing the data operation on the target data partition; and sending a transaction instruction for processing the data transaction to the server based on the transaction identifier.

In implementations, the target data partition includes a partition key in a data table included in a database.

Correspondingly, the data transaction includes a database transaction.

In implementations, a primary key of the data table is composed of at least one primary key column in the data table.

The partition key includes a single partition key composed of a first primary key column of the data table.

In implementations, the transaction instruction includes a transaction commit instruction or a transaction cancel instruction.

In implementations, the processor 702 is further configured to execute the following computer-executable instructions:

receiving prompt information that no database transaction corresponding to the transaction instruction returned by the server exists.

Although the present disclosure is disclosed above using exemplary embodiments, these exemplary embodiments not intended to limit the present disclosure. One skilled in the art can make possible changes and modifications without departing from the spirit and scope of the present disclosure. The scope of protection shall be subject to the scope defined by the claims of the present disclosure.

In a typical configuration, a computing device includes one or more processors (CPUs), an input/output interface, a network interface, and memory.

One skilled in the art should understand that the embodiments of the present disclosure may be provided as a method, a system, or a computer program product. Therefore, the present disclosure may take a form of an entirely hardware embodiment, an entirely software embodiment, or an embodiment having a combination of aspects of software and hardware. Moreover, the present disclosure may take a form of a computer program product implemented on one or more computer usable storage media (which include, but are not limited to, a magnetic disk, CD-ROM, an optical disk, etc.) that include computer usable program codes.

The present disclosure can further be understood using the following clauses.

Clause 1: A data transaction processing method comprising: receiving an application request from a client to perform a data operation in a target data partition; creating a corresponding data transaction according to the application request, and assigning a transaction identifier to the data transaction; returning the transaction identifier that is assigned to the data transaction to the client; performing the data operation based on the target data partition according to the data operation that carries the transaction identifier and is sent by the client; and processing the data transaction according to a transaction instruction sent by the client.

Clause 2: The method of Clause 1, wherein the target data partition includes a partition key in a data table included in the database, and correspondingly, the data transaction includes a database transaction.

Clause 3: The method of Clause 2, wherein a primary key of the data table is composed of at least one primary key column in the data table, and the partition key includes a single partition key composed of a first primary key column of the data table.

Clause 4: The method of Clause 2, wherein the transaction instruction includes a transaction commit instruction or a transaction cancel instruction.

Clause 5: The method of Clause 4, wherein: if the transaction instruction sent by the client is the transaction commit instruction, processing the data transaction according to the transaction instruction sent by the client is implemented by: sending the database transaction to a transaction queue; and reading the database transaction from the transaction queue, creating a transaction log corresponding to the database transaction, and recording a data operation of the database transaction in the transaction log.

Clause 6: The method of Clause 5, wherein reading the database transaction from the transaction queue, creating the transaction log corresponding to the database transaction, and recording the data operation of the database transaction in the transaction log perform the following operation: storing the transaction log in a preset data storage space.

Clause 7: The method of Clause 6, wherein: after storing the transaction log in the preset data storage space is performed, the following sub-operation is performed: deleting the database transaction, and recovering the transaction identifier corresponding to the database transaction.

Clause 8: The method of Clause 4, wherein: if the transaction instruction sent by the client is the transaction cancel instruction, processing the data transaction according to the transaction instruction sent by the client is implemented by: deleting the database transaction, and recovering the transaction identifier of the database transaction.

Clause 9: The method of Clause 3, wherein: after performing the data operation based on the target data partition according to the data operation that carries the transaction identifier and is sent by the client, the following operation is performed: receiving a transaction instruction sent by the client for processing the database transaction.

Clause 10: The method of Clause 9, wherein after receiving the transaction instruction for processing the database transaction sent by the client is performed, the following operations are performed: determining whether a database transaction corresponding to the transaction instruction exists, and returning a prompt message that the database transaction corresponding to the transaction instruction does not exist to the client if not.

Clause 11: The method of Clause 3, wherein a state of the partition key includes at least one of a locked state or an unlocked state, and if the received application request is an application request for performing a data operation under the partition key, the state of the partition key is updated to the locked state.

Clause 12: The method of Clause 11, wherein: after receiving the application request for performing the data operation on the target data partition sent by the client, and before creating the corresponding data transaction according to the application request, and assigning the transaction identifier to the data transaction, the following operations are performed: determining whether the state of the partition key is the unlocked state; and if not, creating the corresponding data transaction according to the application request, and assigning the transaction identifier to the data transaction.

Clause 13: The method of any one of Clauses 3-12, wherein the database includes a logically unified distributed database formed by connecting a plurality of physically dispersed data storage units through a network.

Clause 14: The method of Clause 13, wherein the data transaction processing method is implemented based on a platform of a distributed database deployed in a cloud computing environment, the distributed database platform providing a data access interface for accessing the distributed database, and receiving the application request sent by the client for performing a data operation on a partition key of the distributed database through the data access interface, and/or receiving the transaction instruction sent by the client for processing the database transaction through the data access interface.

Clause 15: A data transaction processing apparatus, comprising: an application receiving unit configured to receive an application request sent by a client for performing a data operation on a target data partition; a data transaction creating unit configured to create a corresponding data transaction according to the application request, and allocate a transaction identifier to the data transaction; a transaction identifier returning unit configured to return the transaction identifier allocated to the data transaction to the client; a data operation submitting and executing unit configured to execute the data operation based on the target data partition according to a data operation sent by the client and carrying the transaction identifier; and a data transaction processing unit configured to process the data transaction according to a transaction instruction sent by the client.

Clause 16: A data transaction processing method comprising: sending an application request for performing a data operation on a target data partition to a server; receiving a transaction identifier of a data transaction corresponding to the application request returned by the server; submitting a data operation carrying the transaction identifier to the server for performing the data operation on the target data partition; and sending a transaction instruction for processing the data transaction to the server based on the transaction identifier.

Clause 17: The method of Clause 16, wherein the target data partition includes a partition key in a data table included in the database, and correspondingly, the data transaction includes a database transaction.

Clause 18: The method of Clause 17, wherein a primary key of the data table is composed of at least one primary key column in the data table, and the partition key includes a single partition key composed of a first primary key column of the data table.

Clause 19: The method of Clause 18, wherein the transaction instruction includes a transaction commit instruction or a transaction cancel instruction.

Clause 20: The method of Clause 20, further comprising: receiving prompt information that no database transaction corresponding to the transaction instruction returned by the server exists.

Clause 21: A data transaction processing apparatus comprising: an application sending unit configured to send an application request for performing a data operation on a target data partition to a server; a transaction identifier receiving unit configured to receive a transaction identifier of a data transaction corresponding to the application request returned by the server; a data operation submitting unit configured to submit a data operation carrying the transaction identifier to the server, for performing the data operation on the target data partition; and a transaction instruction sending unit configured to send a transaction instruction for processing the data transaction to the server based on the transaction identifier.

Clause 22: An electronic device comprising: memory, and a processor, the memory being configured to store computer-executable instructions, and the processor being configured to execute the computer-executable instructions: receiving an application request from a client to perform a data operation in a target data partition; creating a corresponding data transaction according to the application request, and assigning a transaction identifier to the data transaction; returning the transaction identifier that is assigned to the data transaction to the client; performing the data operation based on the target data partition according to the data operation that carries the transaction identifier and is sent by the client; and processing the data transaction according to a transaction instruction sent by the client.

Clause 23: An electronic device comprising: memory, and a processor, the memory being configured to store computer-executable instructions, and the processor being configured to execute the computer-executable instructions: sending an application request for performing a data operation on a target data partition to a server; receiving a transaction identifier of a data transaction corresponding to the application request returned by the server; submitting a data operation carrying the transaction identifier to the server for performing the data operation on the target data partition; and sending a transaction instruction for processing the data transaction to the server based on the transaction identifier.

What is claimed is:

1. A method implemented by one or more computing devices, the method comprising:
    receiving an application request from a client to perform a data operation in a target data partition, the target data partition being a data set that the client desires to operate, the target data partition including a partition key in a data table included in a database, a state of the partition key including at least one of a locked state or an unlocked state;

creating a corresponding data transaction according to the application request;

assigning a transaction identifier to the data transaction, the data transaction including a database transaction;

returning the transaction identifier that is assigned to the data transaction to the client;

performing the data operation based on the target data partition according to the data operation that carries the transaction identifier and is sent by the client; and processing the data transaction according to a transaction instruction sent by the client.

2. The method of claim 1, wherein a primary key of the data table is composed of at least one primary key column in the data table, and the partition key comprises a single partition key composed of a first primary key column of the data table.

3. The method of claim 1, wherein the transaction instruction comprises a transaction commit instruction or a transaction cancel instruction.

4. The method of claim 3, wherein: in response to determining that the transaction instruction sent by the client is the transaction commit instruction, the processing the data transaction according to the transaction instruction sent by the client comprises:

sending the database transaction to a transaction queue;

reading the database transaction from the transaction queue;

creating a transaction log corresponding to the database transaction; and recording the data operation of the database transaction in the transaction log.

5. The method of claim 4, wherein the processing the data transaction according to the transaction instruction sent by the client further comprises:

storing the transaction log in a preset data storage space.

6. The method of claim 5, wherein: after the storing the transaction log in the preset data storage space is performed, the method further comprises:

deleting the database transaction; and recovering the transaction identifier corresponding to the database transaction.

7. The method of claim 3, wherein: in response to determining that the transaction instruction sent by the client is the transaction cancel instruction, the processing the data transaction according to the transaction instruction sent by the client comprises:

deleting the database transaction; and recovering the transaction identifier of the database transaction.

8. The method of claim 1, further comprising:

determining that the database transaction corresponding to the transaction instruction does not exist; and returning a prompt message that the database transaction corresponding to the transaction instruction does not exist to the client.

9. The method of claim 1, wherein: in response to determining that the received application request is an application request for performing the data operation under the partition key, updating the state of the partition key to the locked state.

10. The method of claim 1, wherein: after the receiving the application request for performing the data operation on the target data partition sent by the client, and before the creating the corresponding data transaction according to the application request, and assigning the transaction identifier to the data transaction, the method further comprises:

determining that the state of the partition key is not the unlocked state.

11. The method of claim 1, wherein the database comprises a logically unified distributed database formed by connecting a plurality of physically dispersed data storage units through a network.

12. The method of claim 11, wherein the method is implemented based on a platform of a distributed database deployed in a cloud computing environment, the platform of the distributed database providing a data access interface for accessing the distributed database, and receiving the application request sent by the client for performing the data operation on the partition key of the distributed database through the data access interface, and/or receiving the transaction instruction sent by the client for processing the database transaction through the data access interface.

13. An apparatus comprising:

one or more processors; and one or more memories storing executable instructions that, when executed by the one or more processors, cause the one or more processors to perform acts comprising:

sending an application request for performing a data operation on a target data partition to a server, the target data partition being a data set that the client desires to operate, the target data partition including a partition key in a data table included in a database, a state of the partition key including at least one of a locked state or an unlocked state;

receiving a transaction identifier of a data transaction corresponding to the application request returned by the server, the data transaction including a database transaction;

submitting a data operation carrying the transaction identifier to the server, for performing the data operation on the target data partition; and sending a transaction instruction for processing the data transaction to the server based on the transaction identifier.

14. The apparatus of claim 13, wherein the acts further comprise:

receiving prompt information that no database transaction corresponding to the transaction instruction returned by the server exists.

15. One or more memories storing executable instructions that, when executed by one or more processors, cause the one or more processors to perform acts comprising:

receiving an application request from a client to perform a data operation in a target data partition, the target data partition being a data set that the client desires to operate, the target data partition including a partition key in a data table included in a database, a state of the partition key including at least one of a locked state or an unlocked state;

creating a corresponding data transaction according to the application request;

assigning a transaction identifier to the data transaction, the data transaction including a database transaction;

returning the transaction identifier that is assigned to the data transaction to the client;

performing the data operation based on the target data partition according to the data operation that carries the transaction identifier and is sent by the client; and processing the data transaction according to a transaction instruction sent by the client.

16. The one or more memories of claim 15, wherein: in response to determining that the transaction instruction sent by the client is a transaction commit instruction, the processing the data transaction according to the transaction instruction sent by the client comprises:

sending the data transaction to a transaction queue;
reading the data transaction from the transaction queue;
creating a transaction log corresponding to the data transaction; and
recording a data operation of the database transaction in the transaction log.

17. The one or more memories of claim 15, the acts further comprising:

determining that the database transaction corresponding to the transaction instruction does not exist; and
returning a prompt message that the database transaction corresponding to the transaction instruction does not exist to the client.

18. The one or more memories of claim 15, wherein the database comprises a logically unified distributed database formed by connecting a plurality of physically dispersed data storage units through a network.

19. The one or more memories of claim 15, wherein: in response to determining that the transaction instruction sent by the client is a transaction cancel instruction, the processing the data transaction according to the transaction instruction sent by the client comprises:

deleting the database transaction; and
recovering the transaction identifier of the database transaction.

20. The one or more memories of claim 15, wherein the database comprises a logically unified distributed database formed by connecting a plurality of physically dispersed data storage units through a network.

* * * * *